Figure 9:
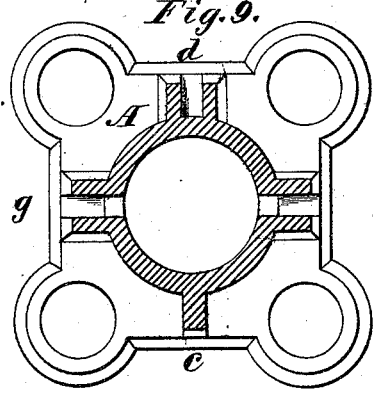

J. A. KAY.
Improvement in Connections for Compound Tubular Metallic Columns.
No. 130,721. Patented Aug. 20, 1872.
3 Sheets--Sheet 1.
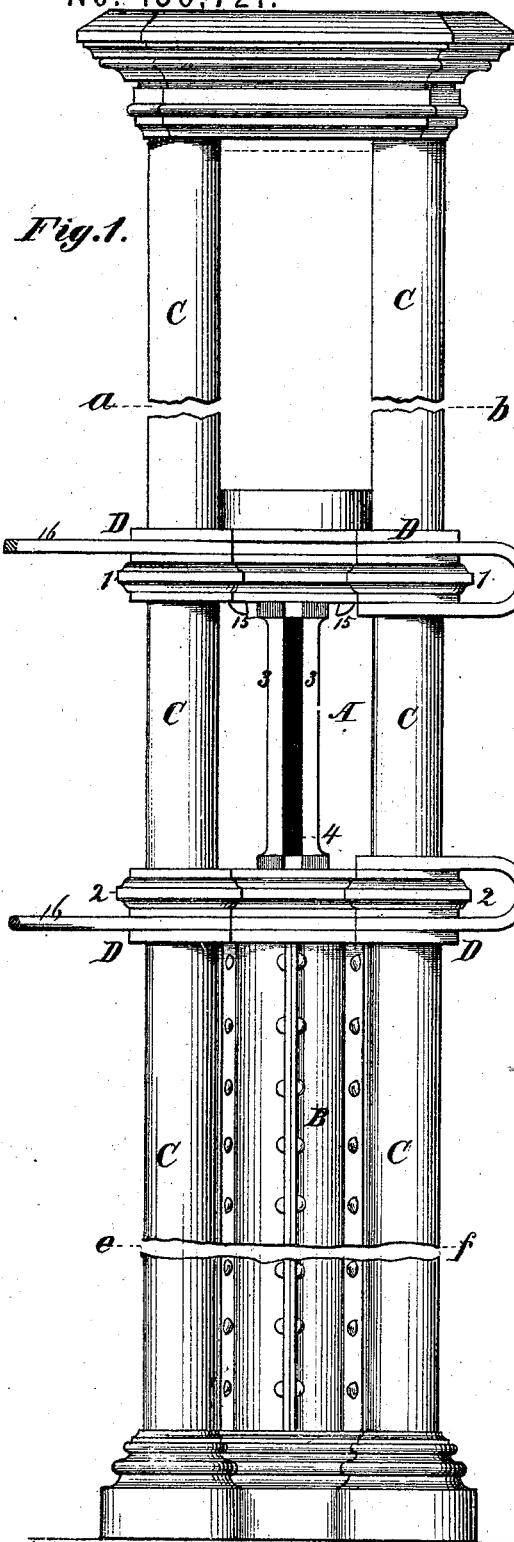
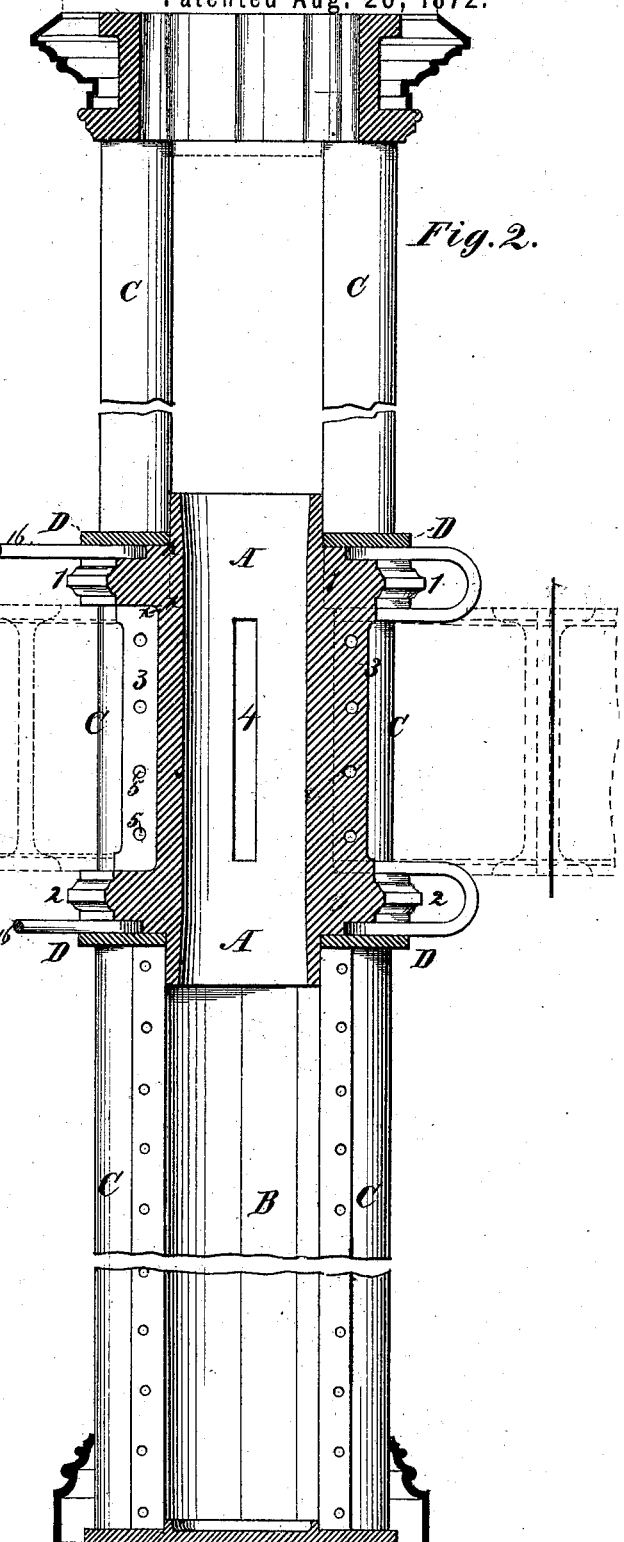

3 Sheets--Sheet 2.
J. A. KAY.
Improvement in Connections for Compound Tubular Metallic Columns.
No. 130,721.                                              Patented Aug. 20, 1872.
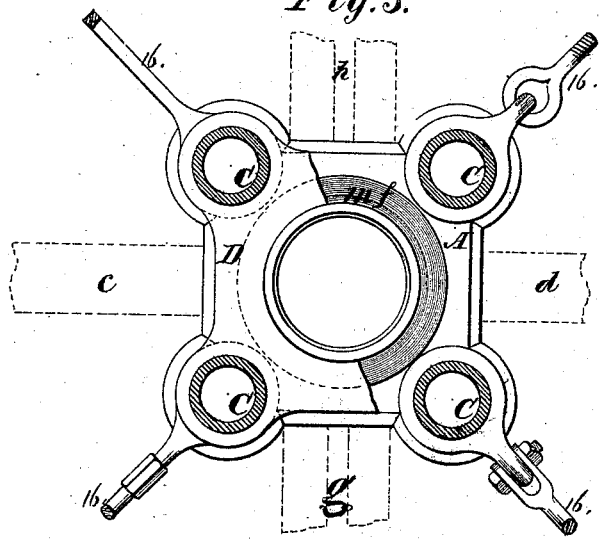
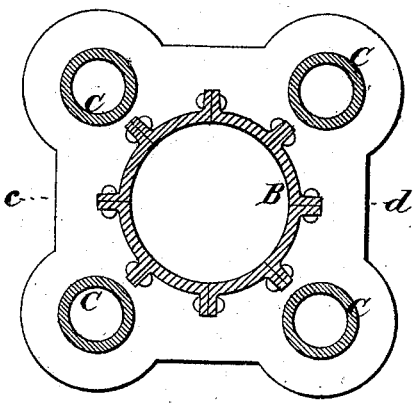
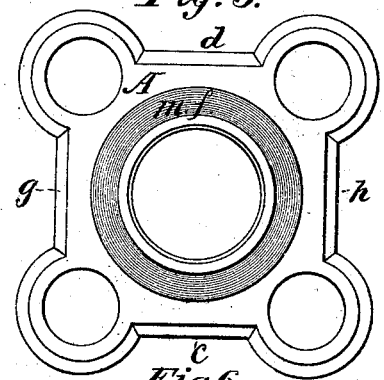
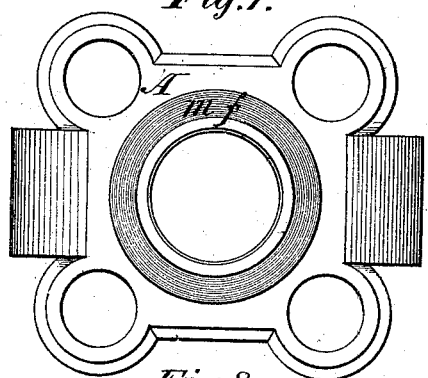
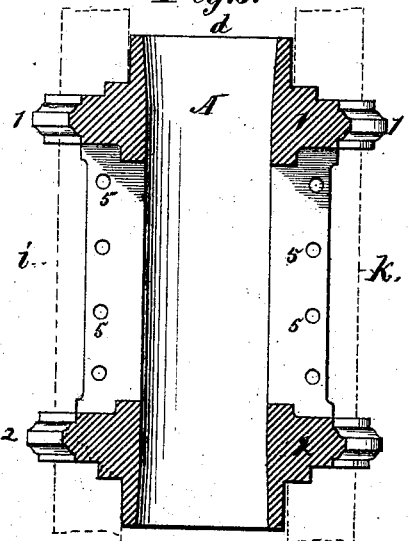
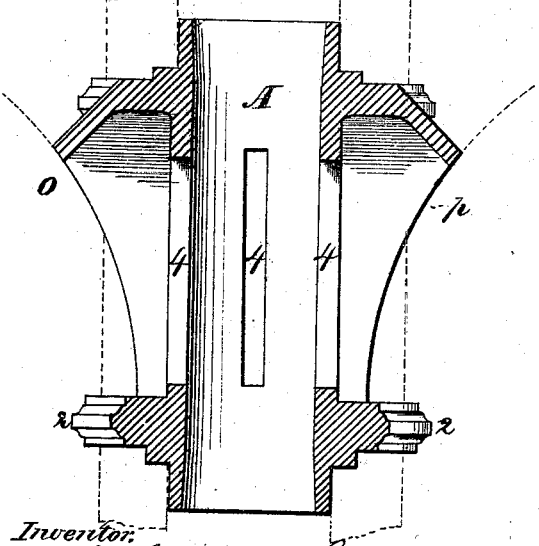
Witnesses.
H. L. Perrine
Jarvis Moulden
Inventor:
John A. Kay
by John J. Halsted, his Atty J. A. KAY.
Improvement in Connections for Compound Tubular Metallic Columns.
No. 130,721. Patented Aug. 20, 1872.

Witnesses.
H. L. Perrine
Jarvis Moulden

Inventor.
John A. Kay
by John J. Halsted
his Atty

UNITED STATES PATENT OFFICE.

JOHN A. KAY, OF ST. CHARLES, MISSOURI.

IMPROVEMENT IN CONNECTIONS FOR COMPOUND TUBULAR METALLIC COLUMNS.

Specification forming part of Letters Patent No. 130,721, dated August 20, 1872.

SPECIFICATION.

*To all whom it may concern:*

Be it known that I, JOHN A. KAY, of St. Charles, in the county of St. Charles and State of Missouri, have invented certain Improvements in Compound Metallic Columns; and I do hereby declare that the following, taken in connection with the drawing which accompanies and forms part of this specification, is a description of my invention sufficient to enable those skilled in the art to practice it.

My invention relates to that class of columns which are made from metallic tubes, and more especially to such as are composed of a central tube, around which are grouped other or smaller tubes parallel therewith, or inclined from the base toward the center, as the case may be, the tubes being in sections and rising one upon and above another, breaking joints, where necessary, and coupled together by appropriate coupling bands or connections; and it may be stated as an improvement upon the invention protected to me by Letters Patent No. 118,021, dated August 15, 1871. My present invention consists, principally, in a novel method of connecting the sections of columns in such a manner that the junctions will also receive and connect horizontal girders or beams and horizontal and diagonal ties and braces, whenever their use is required; the means for effecting this being a hollow connection casting, provided with bands at top and bottom, and also with vertical ribs extending from band to band, the casting being vertically slotted, where required; the function of the bands being to bind together the parallel or inclined tubes or colonettes and to connect together the sections of the main tube, and the function of the ribs being not only to strengthen the casting, but also to act as lugs for attaching girders or beams by bolting or riveting the same thereto, and that of the slots to admit of the passage of ties and braces through the casting. My invention further consists in the employment of wrought-iron coupling plates or bands, applied to the top and bottom, or to either the top or bottom, of the cast band; and it further consists in the method of attaching ties to the colonettes, in connection with the wrought coupling-bands and the cast bands; and it further consists in a wrought-iron hollow or tubular connection, having the same sectional shape as the central shaft, and having wrought-iron angle-irons riveted thereto, and serving not only to stiffen and strengthen it, but also as connecting-lugs for girders; and in other details hereinafter more particularly set forth.

Figure 10:
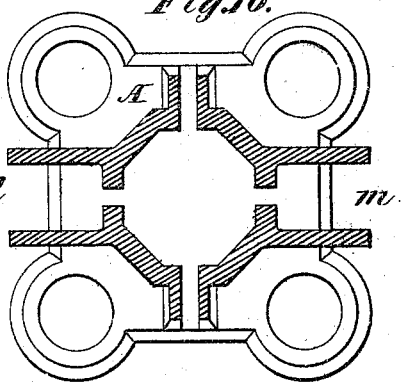
Figure 11:
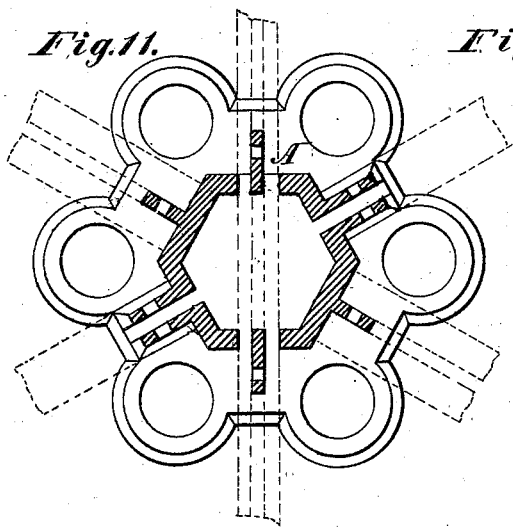
Figure 12:
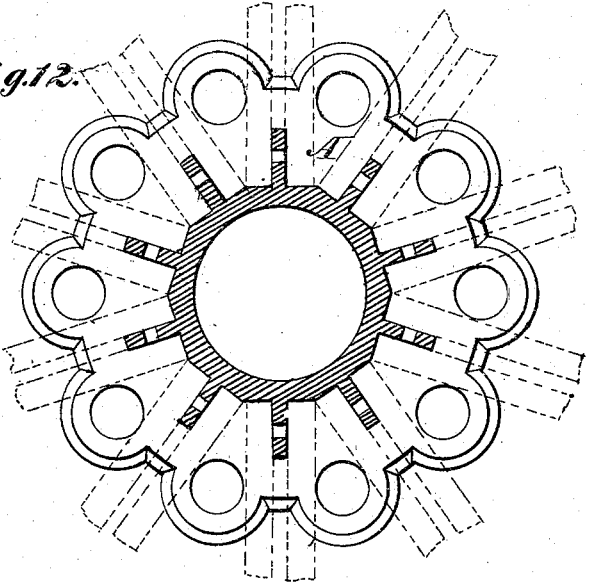
Figure 13:
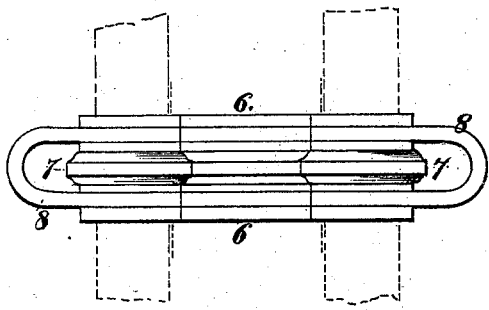
Figure 14:
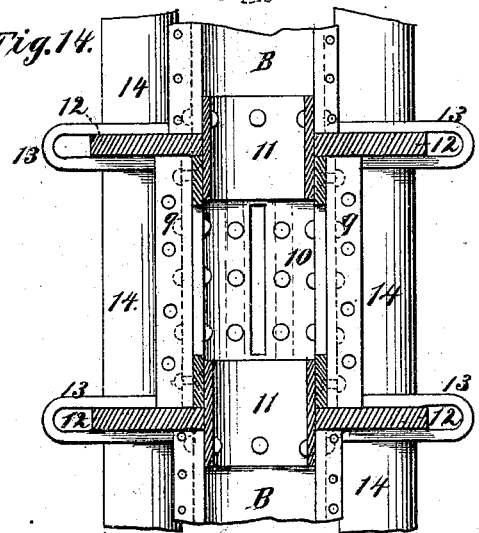

Figure 1 is an elevation, and Fig. 2 a vertical section of a column embodying my improvements, the latter being a section on the line *c d* of Figs. 3, 4, 5, 6, and 9. Fig. 3 is a section on *a b* of Fig. 1, showing four different modes of bracing; and Fig. 4 is a section on *e f* of Fig. 1. Fig. 5 is a top view of the junction or connecting casting in Figs. 1 and 2. Fig. 6 is a vertical section of the same on line *g h* of Figs. 3, 5, and 9. Fig. 7 is a top view of the casting for a column, showing skew-backs for springing arches; Fig. 8, a vertical section on the line *l m* of Fig. 10; Fig. 9, a horizontal section of the junction casting on the line *i k* of Fig. 6; Fig. 10, a horizontal section on the line *o p* of Fig. 8; Fig. 11, a horizontal section of a connection casting for a hexagonal column, showing different methods of bracing and attaching girders; Fig. 12, a horizontal section of a connection casting for a ten-sided column, showing connections for girders. This can be slotted for ties to pass through, if desired. Fig. 13, a modification, in cases where it is not necessary to have connections for beams, showing shackle-loops for securing ties, when required; Fig. 14, a connection made entirely of wrought-iron, instead of the cast-iron ones shown in the other figures.

A in the several figures represents the connection casting; B, the sections of the main shaft; C, the sections of the colonettes; D, the wrought-iron coupling bands or plates. The casting is made tubular, as will be seen, and with bands 1 2 at top and bottom, respectively, and through which bands pass the colonettes, or to which they are held, as well as the main shaft. This casting is also made with ribs 3 3, &c., running lengthwise of the same and reaching from band to band, as seen, and, when required, having slots 4 4 to receive the ends of ties and braces through the same. The casting A not only serves to hold together the several parts of the compound column, but also affords the means of attaching beams or girders by bolting or riveting the same thereto, as seen in Fig. 3, in which the beams are indicated by dotted lines; holes 5 5, Fig. 2, representing bolt-holes; in Fig. 9, which shows several varieties of construction of the ribs; in Fig. 8, which shows how arches are sprung therefrom; and in Figs. 10, 11, and 12, the latter two figures showing the girders or braces in dotted lines. A succession of junctions can be used, one above the other, with or without skew-backs, for arches, as the number of tiers in the structure may require. The skew-backs can, if desired, be applied to all, and can be made to spring from any face of a column, irrespective of the number of its sides and angles. The wrought-iron coupling-plates D are introduced both above and below the connection casting A, and are provided with openings corresponding in position and diameter to those in the casting. These plates afford an extra security against the contingency of damage from extreme cold or against the effects of the sudden throwing on of water during a fire, either of which might fracture the cast lug and liberate the wrought tie. By the use of the wrought plates it will be seen that it will not be possible for the connections of ties to become impaired.

The connection arrangements for the colonettes on the junction casting are the same as described in my patent, No. 118,021, heretofore referred to, and when the construction of the column is such that it is not required to have connections for beams the wrought plates can be applied to the coupling-bands with eyebolts and double-cut nuts, shackle-loops, or any practical device for securing the ties, one form of which is shown in Fig. 13, in which 6 6 represent the wrought plates; 7, the cast coupling; and 8 8, the shackle-loops.

The different arrangements, shown in the various illustrations, as to the modes of attachments, bracing, tying, coupling, &c., will apply to any form of column, whether wrought or cast, which it may be desirable to use for the special purposes required. The connection castings can be made to carry a girder of any required depth; and, if desired, the connection can be made entirely of wrought-iron, as shown in Fig. 14, angle-irons in such case (marked 9 9) being riveted onto the main stem 10 of the connection, so as to take the place and perform the duty of the cast lugs of the connecting castings, and acting, likewise, as supporting-ribs for the wrought coupling-connections for colonettes, the tenons 11 11 at top and bottom being composed of or constituting an inner sleeve, riveted to the main stem and lapping the joint of the tubes. In this figure 12 indicates the wrought coupling-plates; 12, the shackle-loops for ties; and 14, the colonettes.

The parts marked $m\ f$ in the several figures designate that the metal is there machine-faced, if required, for more perfect fitting.

In Figs. 1 and 2 I have not illustrated the upper central shaft. The lateral braces are indicated at 16 in Figs. 1, 2, and 3. The dotted lines at the central part of Fig. 2 indicate floor-beams or girders connecting with the column; those at the top indicate a top skew-back. The cap is shown hollow, to allow the central shaft to pass through, if desired; or it may be made solid, with an annular boss to enter the head of the column, similar to that on the bed-plate, as shown by the dotted lines. The dotted lines in Fig. 3 indicate floor-beams or girders, connecting with the column.

While I have in Fig. 9 shown three different methods of attaching the girders to the lugs or flanges of the connection casting, yet any of the ordinary and well-known attachments can be used to suit the circumstances of the case.

In Figs. 7 and 8 I have shown a method of carrying skew-backs and the slots for passing braces and ties through, if required.

Any columns made agreeably to my present and above-described invention, may be ornamented after the manner described in my patent above named, or in any other manner, according to taste.

Although I have described the bands as cast solid or integral with the connection casting, and consider this the best in practice, yet I propose, in some cases, to make the bands separate from the connection casting and to key them to the vertical ribs of such casting, as shown at 15 in Fig. 1, and in dotted lines $x\ x\ x$ in Fig. 2.

What I claim, and desire to secure by Letters Patent, as improvements in compound tubular metallic columns, is as follows:

1. A hollow connection casting, made with bands at top and bottom and with vertical ribs running from band to band, the casting being vertically slotted, where required, the function of the bands being to bind together the parallel tubes or colonettes and to connect together the sections of the tubes, that of the ribs being both to strengthen the casting and to act as lugs for attaching girders or beams by bolting or riveting the same thereto, and that of the slots to admit of the passage of ties and braces through the casting, substantially as shown and described.

2. I claim the wrought-iron coupling-band, combined with the connecting casting, and applied to its top or bottom, or to both top and bottom, as and for the purpose specified.

3. The method, as herein shown and described, of attaching ties to the colonettes, in connection with the wrought coupling-bands and the cast bands.

4. The wrought-iron hollow connection, having the same sectional shape as the central shaft and having wrought angle-irons riveted to the same to stiffen it and to serve as connecting-lugs for girders, wrought coupling-bands for colonettes at top and bottom, and wrought tenon-sleeves to receive the lower and upper sections of the central shaft, the body being slotted to admit of the passage of ties and braces, all substantially as described, and as shown in Fig. 14.

JOHN A. KAY.

Witnesses:
E. C. STEWART,
JNO. K. McDEARMAN.